UNITED STATES PATENT OFFICE.

MAX BAZLEN, OF LUDWIGSHAFEN-ON-THE-RHINE, GERMANY, ASSIGNOR TO THE BADISCHE ANILIN & SODA FABRIK, OF LUDWIGSHAFEN-ON-THE-RHINE, GERMANY, A CORPORATION OF GERMANY.

HYDROSULFITE FOR REDUCING INDIGO.

SPECIFICATION forming part of Letters Patent No. 719,720, dated February 3, 1903.

Application filed December 20, 1899. Serial No. 740,988. (No specimens.)

*To all whom it may concern:*

Be it known that I, MAX BAZLEN, doctor of philosophy, a subject of the King of Würtemberg, residing at Ludwigshafen-on-the-Rhine, in the Kingdom of Bavaria, Germany, have invented new and useful Improvements in Hydrosulfites for Reducing Indigo, of which the following is a specification.

In dyeing cotton with indigo in the so-called "chemical-vat" the custom has been to place several chemicals in the stock-vat for the production therein of the reducing agent of the indigo. Usually these chemicals were bisulfite of soda and zinc-dust, with the addition of lime for removing the zinc from the solution. The product thus formed in the stock-vat consisted of soluble bodies and insoluble bodies, such as zinc or its compounds, which, if they went onto the fiber with the indigo, impaired the result, the hydrosulfite constituting not to exceed fifty per cent. of such soluble bodies. When removed from solution by any known process, the hydrosulfite obtained constituted not to exceed forty per cent. of the product, which according to literature was an unstable body quickly absorbing oxygen from the air, decomposing even when not exposed to the air, and not capable of being dried without decomposition.

I have invented a product which I produce commercially either in the form of a solution in water or as a dry solid. It is substantially free from insoluble bodies, such as zinc or its compounds. It combines a low specific gravity with high reducing power, so that with a density of, say, 16° Baumé say seven and one-half liters or less of the solution are sufficient to reduce one kilogram of pure indigo, or, in other words, one hundred cubic centimeters of a 17° Baumé solution of it in water contains substantially nine grams or more of alkali hydrosulfite. Moreover, my new product is substantially unchangeable under commercial conditions for a reasonable length of time and can therefore be made in advance of its use and, if need be, transported and dealt in as an article of commerce, and which when placed in the stock-vat is an already-formed reducing agent substantially unimpaired in its action by the presence of any of those insoluble bodies which have necessarily characterized the hydrosulfite reducing agents hitherto formed in the stock-vat.

In the present application for patent I desire to claim the new product generically, whether in solution or in solid form, and also specifically in solution, and I do not in this application claim the general process for the manufacture of hydrosulfites nor specifically the new hydrosulfite in solid form, which process and specific form constitute, respectively, the subject-matter of separate applications for Letters Patent of even date herewith, numbered, respectively, 740,986 and 740,987.

The following examples will serve to illustrate the manner in which my new product can be made.

Example 1: Take about twenty-five (25) kilograms of sodium bisulfite having a density of 40° Baumé and to this add about fifty-four (54) kilograms of aqueous sulfurous acid containing about six per cent. $SO_2$, or prepare a similar solution by adding to the twenty-five kilograms of sodium bisulfite of the aforesaid density about fifty-one (51) liters of water and pass gaseous sulfurous acid through the solution until the weight has been increased by about three and a quarter kilograms. Then add slowly about four and one-fifth ($4\frac{1}{5}$) kilograms of zinc-dust. During this addition keep the solution at a temperature between 30° and 40° centigrade by suitably cooling. When all the zinc-dust has been added, stir for some time, and then allow the mixture to stand for an hour or two. Next treat the liquid with milk of lime prepared from about four and one-fifth ($4\frac{1}{5}$) kilograms of quicklime and twenty (20) liters of water. Stir well, and finally allow the mixture to stand for at least six hours more. Then filter through a filter-press. From the above-mentioned quantity of twenty-five kilograms of sodium bisulfite of 40° Baumé, according to the usual process hitherto practiced, sufficient hydrosulfite results to reduce rather less than five kilograms of indigo in the vat, while when working according to this example about eighty kilograms of sodium-hydrosulfite solution possessing a density of about 11° Baumé are obtained, which are sufficient to reduce twice the aforesaid quantity of indigo to indigo-white in the vat. This solution therefore contains about ninety (90) grams per liter of sodium hydrosulfite, to which the formula $Na_2S_2O_4$ is ascribed.

Example 2: In order to produce a highly-concentrated hydrosulfite solution, mix together about twenty-eight and four-fifths (28⅘) kilograms of sodium bisulfite of about 40° Baumé density and thirty-four and a half (34½) kilograms of concentrated aqueous solution of sulfur dioxid, (containing about ten per cent. $SO_2$,) or prepare a similar solution by diluting the sodium bisulfite with about thirty-one (31) liters of water and causing it to absorb the corresponding quantity of gaseous sulfur dioxid. To the solution obtained in either of the ways described add gradually about four and four-fifths (4⅘) kilograms of zinc-dust, as described in the foregoing example. Precipitate the zinc oxid with milk of lime prepared from four and four-fifths (4⅘) parts of quicklime and sixteen (16) liters of water and filter. When proceeding as hereinbefore described, one obtains a solution of the said neutral sodium hydrosulfite registering about 15° to 16° Baumé and of which ten kilos are sufficient to reduce just under two kilograms of one hundred per cent. indigo. This solution therefore contains about one hundred and twenty (120) grams per liter of sodium hydrosulfite, to which the formula $Na_2S_2O_4$ is ascribed. The quantities and strengths of the solutions given in this example are so calculated that the quantity of alkali present in the sodium bisulfite is after the reduction equivalent to the quantity of hydrosulfurous acid formed, so that neutral sodium hydrosulfite is obtained. Of course if the concentration of any of the solutions employed be varied corresponding alterations must be made in the quantities or strengths of the other ingredients in order to obtain the best result.

In the foregoing examples of the formation of my alkaline hydrosulfite I have described that form in which sodium is the alkali; but I do not wish to be understood as limiting my claims in this respect to the exclusion of other alkalies.

In addition to the characteristics of my new product above set forth I may mention the following: Upon the addition of common salt to the solution of my new product the new product is obtained in solid form, which is chemically the neutral salt of the alkalies. It can be dried and is fairly stable when dry, especially if kept in a closed vessel. On exposure to the air it slowly oxidizes and the smell of sulfur dioxid can be observed. In contact with the air in a moist state a rather rapid oxidation takes place, so that the mass becomes warm, while sulfur dioxid is given off. The new salts decolorize a solution of indigo sulfo-acid immediately, and on warming with indigo and caustic-soda solution an indigo-vat is obtained.

When my product is in the sodium form, (sodium hydrosulfite,) it can by slowly crystallizing be obtained in prismatic crystals which have a strong refractive action on light. Its purified salt possesses a composition corresponding to the formula $Na_2S_2O_4 + 2H_2O$. It contains water of crystallization, which it loses upon heating to 110° centigrade. Upon titrating the purified salt with indigo sulfo-acid in aqueous solution it can be ascertained to contain about eighty-two per cent. $Na_2S_2O_4$. Upon heating it melts, and at a red heat it burns with a bluish flame, emitting sulfur dioxid. The determination of the reducing capacity of a specimen of the product against sulfonated indigo, which is to be carried out in the absence of air, showed that the specimen contained 99.5 per cent. $Na_2S_2O_4 + 2H_2O$. (One molecule indigo—two hundred and sixty-two parts being equivalent to one molecule $Na_2S_2O_4 + 2H_2O$—equals two hundred and ten parts.)

Now what I claim is—

1. As a new article of manufacture, the indigo-reducing agent which can be obtained by the reduction of a mixture of sodium bisulfite and sulfurous acid, which in its purified form has a chemical composition corresponding to the formula $Na_2S_2O_4 + 2H_2O$, and one hundred cubic centimeters of a 17° Baumé solution of which in water contain nine grams or more of sodium hydrosulfite, as shown by its reducing capacity for indigo, substantially as described.

2. As a new article of manufacture, the solution of indigo-reducing agent which can be obtained by the reduction of a mixture of soluble bisulfite and sulfurous acid and one hundred cubic centimeters of which at 17° Baumé contain nine grams or more of alkali hydrosulfite, as shown by its reducing capacity for indigo, substantially as described.

In testimony whereof I have hereunto set my hand in the presence of two subscribing witnesses.

MAX BAZLEN.

Witnesses:
ERNEST F. EHRHARDT,
JULIUS ABEL.